United States Patent

Germanetti

[19]

[11] Patent Number: 5,915,273
[45] Date of Patent: Jun. 22, 1999

[54] FLIGHT INDICATOR FOR A HELICOPTER

[75] Inventor: Serge Alexandre Marc Germanetti, Marseille, France

[73] Assignee: Eurocopter, Marignane Cedex, France

[21] Appl. No.: 08/870,403

[22] Filed: Jun. 6, 1997

[30] Foreign Application Priority Data

Jun. 7, 1996 [FR] France .................................. 96 07040

[51] Int. Cl.⁶ .............................................. G01C 21/00
[52] U.S. Cl. ......................................................... 73/178 H
[58] Field of Search .................................. 73/178 H, 65, 73/117.2, 116; 340/945, 946, 963; 364/433, 463, 551.01, 557, 567

[56] References Cited

U.S. PATENT DOCUMENTS

| | | | |
|---|---|---|---|
| 4,763,285 | 8/1988 | Moore et al. | 73/178 H |
| 4,780,838 | 10/1988 | Adelson | 364/567 |
| 4,787,053 | 11/1988 | Moore | 364/551.01 |
| 5,257,190 | 10/1993 | Crane | 73/117.2 |

FOREIGN PATENT DOCUMENTS

| | | |
|---|---|---|
| 0 275 192 | 7/1988 | European Pat. Off. . |
| 0 286 120 | 10/1988 | European Pat. Off. . |
| 1416344 | 9/1965 | France . |

Primary Examiner—William Oen
Attorney, Agent, or Firm—Fisher, Christen & Sabol

[57] ABSTRACT

A flight indicator for an aircraft, intended to give the power margin available on at least one engine of the aircraft as a function of the flight conditions. The indicator includes sensors (2, 3, 4) capable of delivering data relating to various monitored parameters of the engine, device (5) for processing the data coming from the sensors (2, 3, 4), and display device (6) showing, on a display screen (7) the processed data relating to that parameter among the monitored engine parameters, whose current value is closest to the limiting value for such parameter, each limiting value being established taking the ambient pressure (P0) and ambient temperature (T0) into account, in real time.

6 Claims, 3 Drawing Sheets

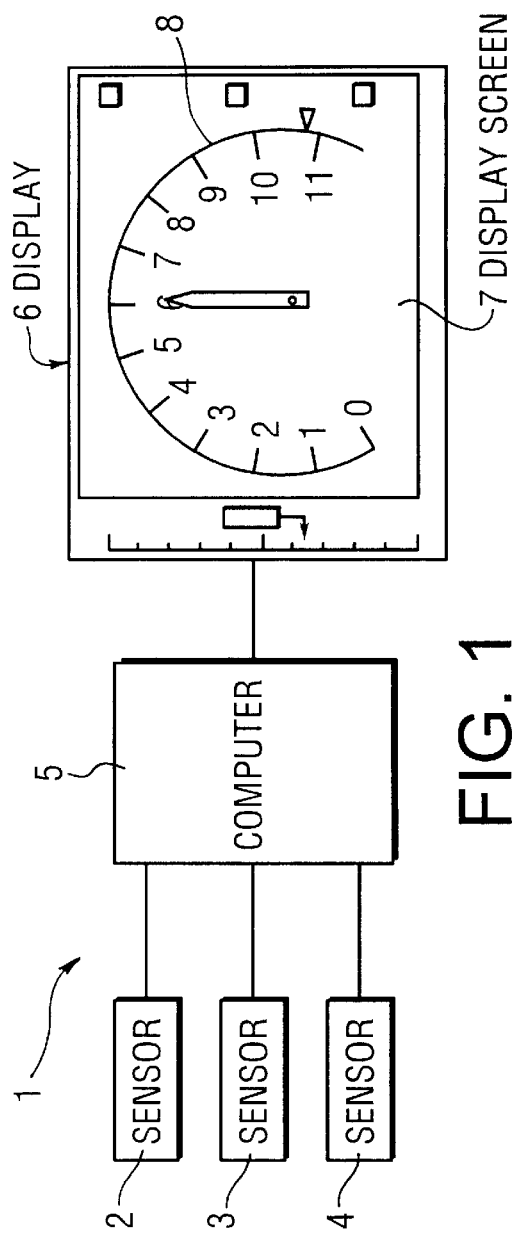
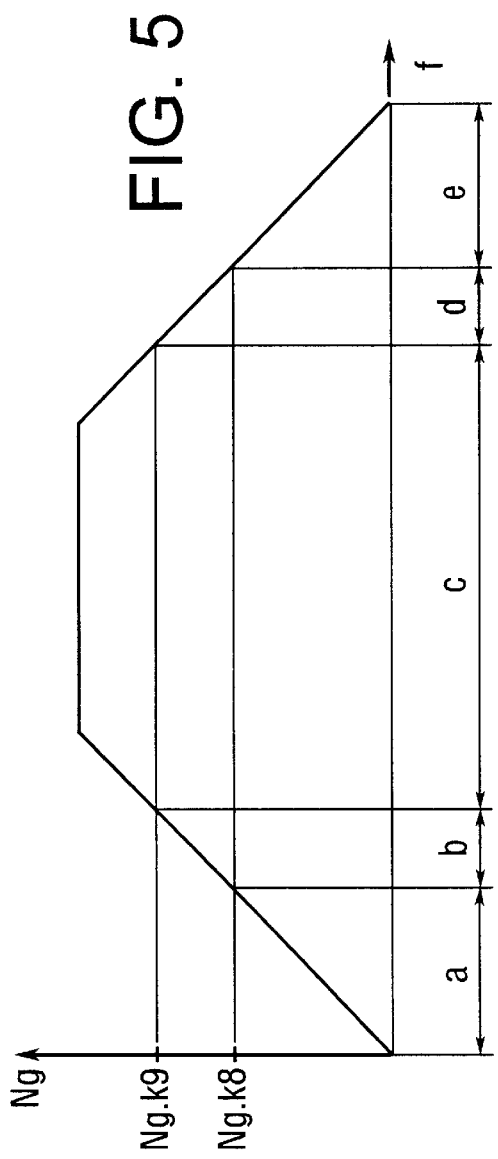

FLIGHT INDICATOR FOR A HELICOPTER

The present invention relates to an aircraft light indicator.

Such an indicator is more particularly designed or a rotary-wing aircraft, especially a helicopter.

A helicopter is flown monitoring a great many instruments on the control panel, which instruments for the most part represent the operation of the engine and associated components and the aircraft. For physical reasons, there are many limitations that the pilot has to take into account at every moment during the flight. These various limitations generally depend on the phase of flight and on the external conditions.

Most helicopters built these days are equipped with one or two turbine engines, usually with a free turbine. The power is therefore drawn off from a low-pressure stage of the turbine, which stage is mechanically independent of the compressor assembly and of the high-pressure stage of the turbine. As a turbine engine runs at between 30,000 and 50,000 revolutions per minute, a special reduction gearbox—the main gearbox—is needed for connecting it to the rotor(s).

The thermal limitations both on the engine and on the main gearbox allow three speeds at which the engine is used to be defined:

- the take-off speed which is not a limitation on the engine, but on the maximum power that the gearbox can absorb without being damaged in any way, bearing in mind its inherent cooling capability: this is then known as the maximum take-off power (PMD),
- the maximum continuous speed for which at no time are either the gearbox capabilities or the capabilities resulting from the maximum permissible heating past the high-pressure blading of the first turbine stage exceeded: this is the maximum continuous power (PMC),
- the maximum transient speed, defined by the governor stops: this is then known as the maximum transient power (PMT).

The engine test engineer, through calculation or testing, establishes the curves of available power of a turbine engine as a function of the altitude and of the temperature, and does this for each of the three speeds defined hereinabove.

The limitations given are generally monitored using three parameters: the speed (Ng) of the gas generator, the engine torque (Cm) and the temperature (T4) at which the gases are ejected at the entry to the free turbine.

Hitherto, these three parameters have been displayed on three different screens (dials) which may be situated at different points on the aircraft control panel. This means that it is difficult for the pilot on the one hand, to see all of this data and, on the other hand, to pick out the data which has a major influence on flying.

In addition, Patent FR-1 416 344 discloses an aircraft flight indicator intended to give the power margin available on at least one engine of the aircraft as a function of the flight conditions, this indicator being noteworthy, according to the invention, in that it comprises:

- sensors capable of delivering data relating to various monitored parameters of the engine,
- means of processing the data coming from said sensors, and
- display means showing, on a display screen, the processed data relating to that parameter among said monitored engine parameters, whose current value is closest to the limiting value for said parameter.

However, the measurements obtained by such an indicator are still absolute measurements.

The object of the present invention is to avoid this drawback.

To achieve this, said limiting values for each parameter are established taking the ambient pressure (P0) and ambient temperature (T0) into account, in real time.

The indicator of the invention therefore identifies, as relative values, from among the essential monitored engine parameters, that one which is closest to its limit. The data relating to the limitations to be complied with are therefore grouped together in a single display which, on the one hand, allows them to be summarized and just the result of this summary to be displayed in order to make the pilot's job simpler and, on the other hand, makes it possible to save space on the control panel.

More particularly, when the flight indicator according to the invention is intended for a rotary-wing aircraft, especially a helicopter, including at least one turbine engine for driving at least one rotor, said monitored engine parameters are:

- the speed (Ng) of the gas generator,
- the temperature (T4) at which the gases are ejected at the inlet to the free turbine, and
- the engine torque (Cm).

Advantageously, in said processing means, the values of the gas generator speed (Ng) and of the gas temperature (T4) are converted to a scale which is comparable with the engine torque, after they have been compared with their respective limits.

As a preference, said limits are established taking account of any power (electrical, or the drawing-off of gas known as P2) drawn off from the aircraft engine.

In particular, said values of the gas generator speed (Ng), of the gas temperature (T4) and of the engine torque (Cm) can be expressed as percentages of their respective limits.

When the aircraft is operating "normally", just one dial showing the parameter whose current value is closest to the limiting value for said parameter is displayed on said display screen.

However, as many dials as there are monitored engine parameters may be displayed on said display screen, the parameter whose current value is closest to the limiting value being emphasized, for example by underlining its numerical value expressed in figures, and this may be done when the aircraft is operating under certain conditions which will be explained later.

The figures of the attached drawing will make it easy to understand how the invention may be achieved. In these figures, identical references denote similar elements.

FIG. 1 is a block diagram of the flight indicator according to the invention.

FIG. 5 is a curve illustrating various phases of flight.

Figure 2:
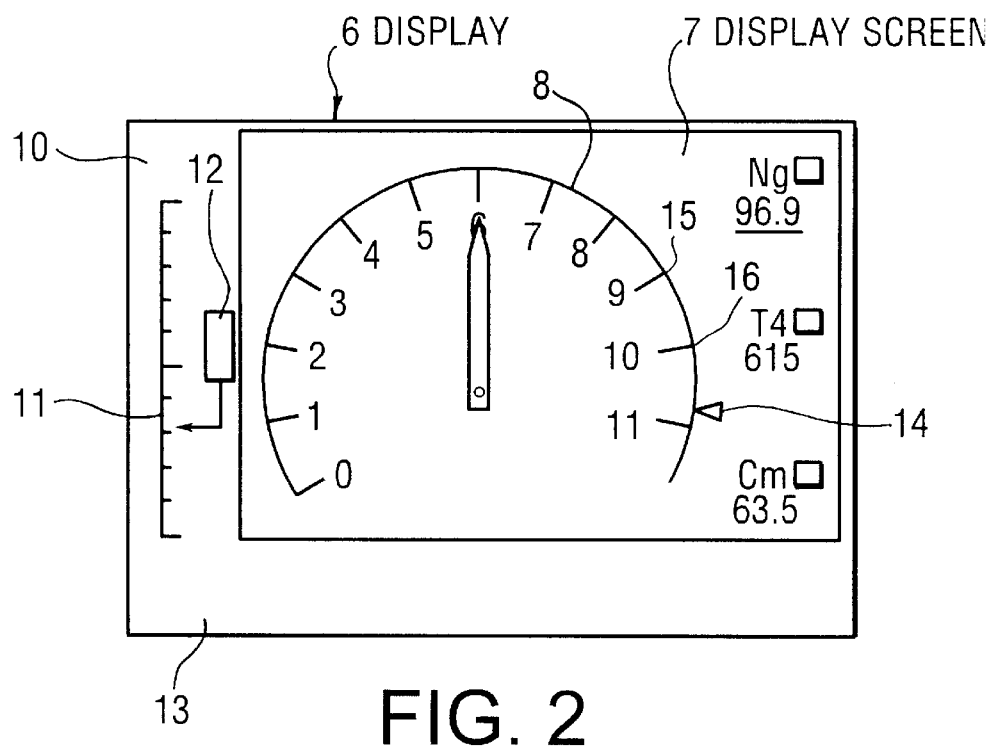
FIG. 2 shows the display screen associated with the indicator according to the invention, in the mode in which one data item is displayed (single dial).

The aircraft flight indicator according to the invention is intended to give (display) the power margin available on at least one engine of the aircraft as a function of the flight conditions. Although it can be used in other types of aircraft, the following description will refer to the specific example of a rotary-wing aircraft (helicopter) with at least one turbine engine for driving at least one rotor, with the specific monitored engine parameters associated with this example (one engine and one rotor).

In the case described here, the following parameters will be taken into account:

Ng—rotational speed or speed of the gas generator,

T4—temperature at which the gases are ejected at the inlet to the free turbine,

Cm—engine torque.

Furthermore, it is clearly understood that in the case of a helicopter with several engines, such an indicator can be used for each of said engines.

As can be seen in FIG. 1, the indicator 1 according to the invention comprises various sensors 2, 3, 4 relating to the various parameters mentioned herein-above, respectively, and capable of delivering the information corresponding to these various parameters to a computer 5 which processes said data. Display means 6 show, on a display screen 7, the processed data relating to that parameter, known as the "limiting parameter", from among said monitored engine parameters, whose current value is closest to the limiting value for said parameter. For this reason, the indicator 1 will also be known hereafter as a "first limitation instrument", or "IPL" for short.

As will be seen in detail later, the display may adopt different modes depending on the phase of flight or flight conditions, or the pilot's wishes. In the "normal" case, the display, as shown in FIGS. 1 and 2, will be in the form of a dial 8 with just one pointer, representing the current value of the limiting parameter.

Figure 3:
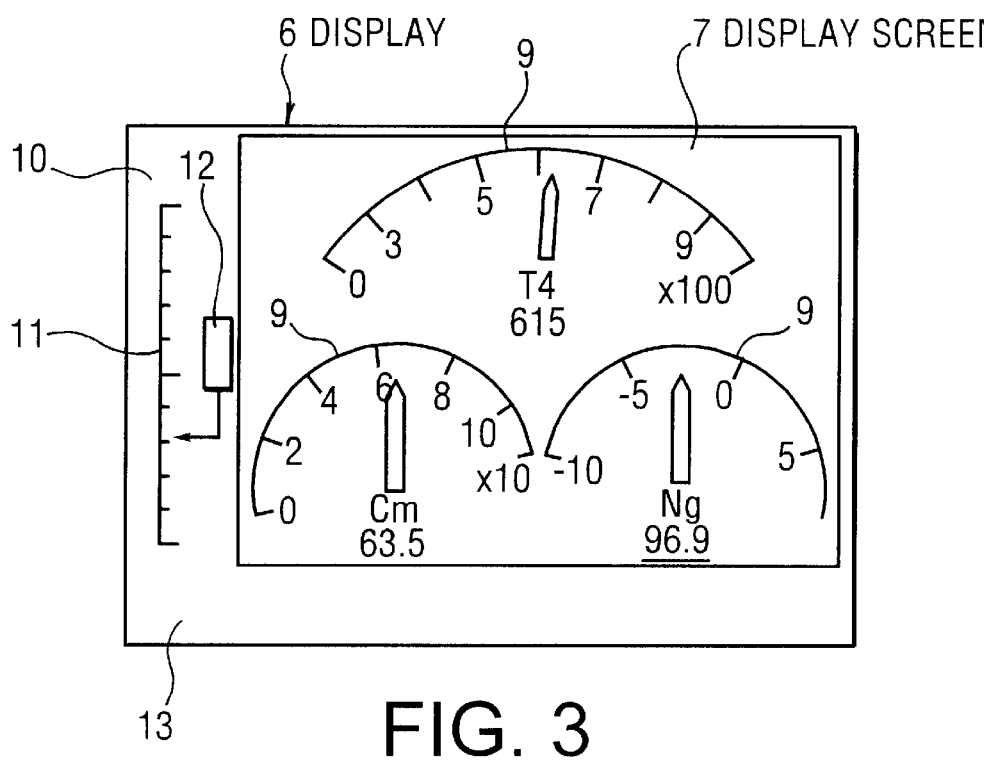
FIG. 3 shows the same display screen as in FIG. 2, in the mode in which three data items are displayed.

In contrast, as shown in FIG. 3, the display screen 7 may show the three dials 9 relating to the three parameters Ng, T4 and Cm, respectively, the numerical value of the limiting parameter being, for example, underlined as shown in the figure. Obviously all the numerical values indicated in FIGS. 2 and 3 are given merely by way of illustrative example.

In addition to the dials 8, 9 described earlier, it is possible to display various data items on the display screen 7 including, in the field 10 lying to the left of the dial or dials 8, 9, the fuel gage 11, including an auxiliary reserve indicator 12. Furthermore, data such as the mass of fuel available, the breakdown of one computer in a dual system with two computers, the fact that a parameter has exceeded its limit, the temperature of the external air, may be displayed in the strip 13 along the bottom of the display screen.

In addition, the drawing-off of air under pressure at high temperature at the stage 2 of the turbine engine, denoted P2 (equivalent value of the diameter of the tapping orifice), for air-conditioning the cabin, for example, can be indicated, if such air is drawn off.

As regards the parameter Ng, i.e. the speed (or number of revolutions) of the gas generator, it is rather the value of $\Delta Ng$ which is actually taken into account, $\Delta Ng$=limiting Ng for PMD at the current T0, P0−measured Ng where T0 and P0 are the ambient temperature and ambient pressure, respectively.

When there is a P2 tapping, and if this is to be taken into account, the indication of Ng then becomes the previous value minus the corresponding effect (for example if, without a P2 tapping, $\Delta Ng$=−4.1% and if the P2 tapping is equal to 1%, then $\Delta Ng$=3.1%, the value shown in FIG. 3).

In FIG. 2, the setup of the indicator 1 allows various regions to be defined:

region from 0 to 9: indications in green region from 9 to 10: indications in yellow red triangle 14 at PMT, and PMC at 15=90% of PMD at 16

PMT=107% of PMD.

Of course these settings are given as examples. They vary depending on the type of aircraft considered.

For this same example, the following table can be constructed regarding the display of the values Cm, Ng, T4:

|    | 0 | PMC 90% | PMD 100% | PMT 107% |
|----|---|---------|----------|----------|
| Cm | $a_o$ | $a_1$ | $a_2$ | $a_3$ |
| Ng | $b_o$ | $b_1$ | $b_2$ | $b_3$ |
| T4 | $c_o$ | $c_1$ | $c_2$ | $c_3$ | i.e., if $Cm=a_{ij}<a_i<a_{ij}<a_{i+1}$;

$$Cm = 90\% + 10\% \times \frac{a_{ij} - a_i}{a_{i+1} - a_i}$$

and likewise for Ng and T4.

It is the variable whose percentage value is highest out of Cm, T4 and Ng which will be displayed on the indicator of the invention (display with one dial), with a reference value ("0") which, as the case may be, corresponds to $a_o$, $b_o$ or $c_o$, and the corresponding value of the parameter displayed with the value respectively of 9.10 or 10.7 (on the screen in this example) at the speeds PMC, PMD and PMT, respectively.

The purpose of displaying the data for controlling the power of the engine and associated components of the aircraft is therefore to display the parameters regarding the temperature (T4) at which the gases are ejected at the inlet of the free turbine, the speed (Ng) of the gas generator, and the engine torque (Cm):

either in the form of three distinct data items $\Delta Ng$ (and Ng), T4, Cm (the data items $\Delta Ng$ and Ng are functions of T0, P0 and the state of the aircraft, $\Delta Ng$ not taking account of the curbing which results from the P2 tapping), or in the form of a single data item which summarizes these three data items by showing the limiting parameter, advantageously as a percentage of its limitations in cruising flight, take-off and transient speed (the limitations on Ng then depend on T0, P0 and on the P2 tapping).

More precisely, the data is shown in the form of three separate data items (three dials), but on one and the same screen:

before the engine is started up and during engine start-up with, for data item T4, limitations specific to the engine start-up phase (if the parameters T0 and P0 are not valid then $\Delta Ng$ will not be displayed), when the engine is running, if one of the parameters (Ng, T4, Cm, T0, P0) is not valid or if inconsistency between the parameters Ng, T4 and Cm is detected (if the anomaly relates to T0 or P0, $\Delta Ng$ will not be displayed; the data item T4 will show limitations of the "flight" type), at the pilot's request (in this case, the data item T4 will show limitations of the "flight" type).

In terms of the display, this leads to five distinct types of display:

(a) mode in which three data items are displayed for the start-up/shut-down phases, (b) mode in which three data items are displayed for the start-up/shut-down with breakdown phases, (c) mode in which three data items are displayed for the flight with breakdown phases, (d) mode in which three data items are displayed for flight phases at the pilot's request, (e) mode in which one data item is displayed for "normal" phases of flight.

Figure 4:
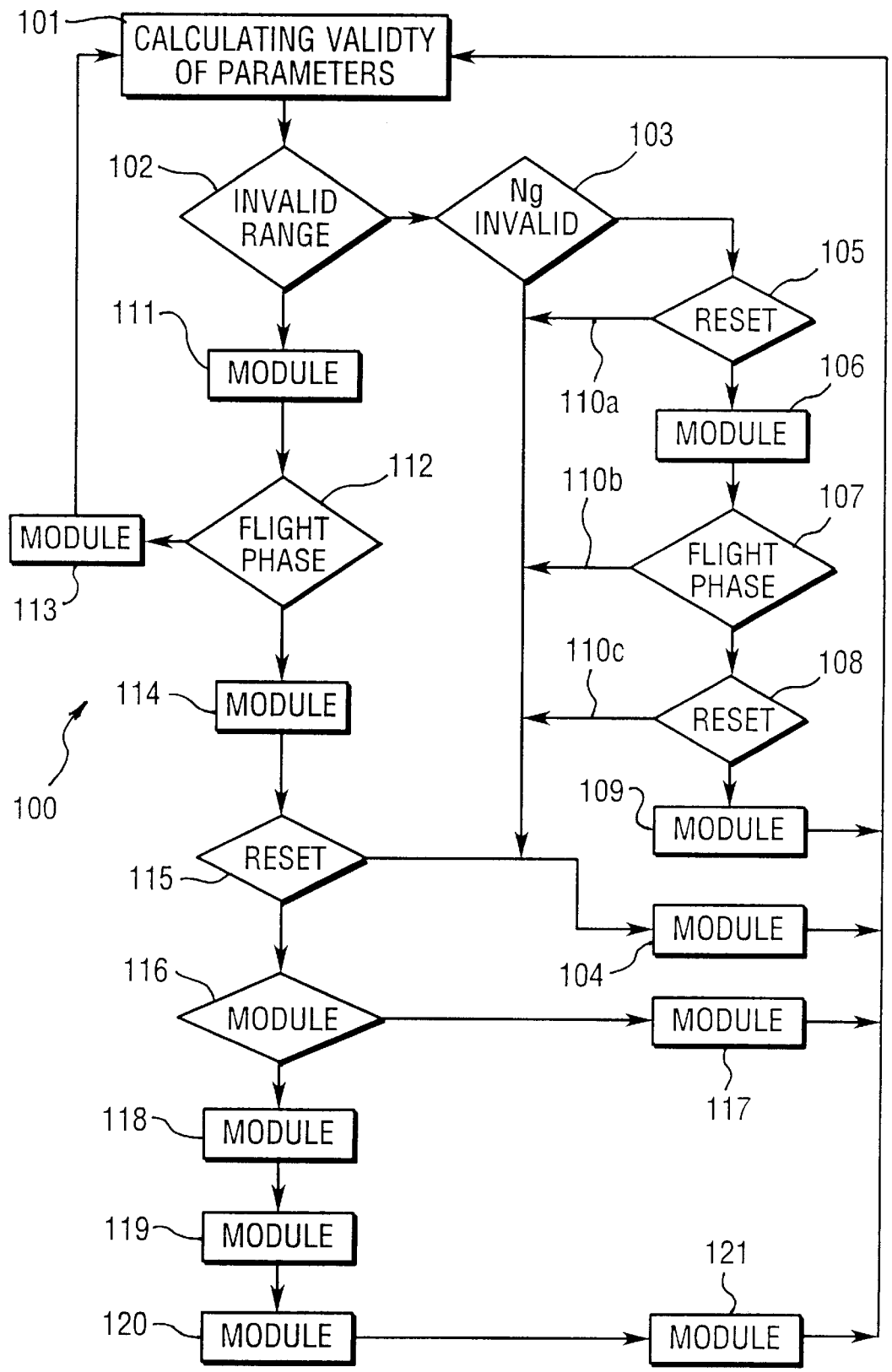
FIG. 4 is a flow chart showing the overall organization of the function of displaying the data for controlling the power of the engine.

The overall organization of the function of displaying the data items for controlling the engine power is described with reference to the flow chart 100 represented in FIG. 4.

If, from calculating 101 the range of validity of the parameters, the validity 102 of the range is "invalid", then, if the validity 103 of Ng is "invalid", then the module 104 for displaying three data items with limitations on T4 of the "flight" type and a breakdown message is called up.

Otherwise, if the reset 105 output is "yes" then the module 106 for detecting the operating phase is called up, if the phase of flight 107 is the "start-up/shut-down" phase, then, if the reset 108 output is "yes", then the module 109 for displaying three data items with limitations on T4 at start-up and breakdown message is called up.

Otherwise, the module 104 for displaying three data items with limitations on T4 of the "flight" type and breakdown message is called up (links 110*a*, 110*b*, 110*c*.

If the validity 102 of the range is "valid" then the module 111 for detecting the operating phase is called up. If the phase of flight 112 is the "start-up/shut-down" phase then the module 113 for displaying three data items with limitations on T4 at start-up is called up, otherwise the module 114 for calculating the losses in motive power (P2 tapping) is called up. If the reset 115 output is "yes" and if the output from the module 116 corresponding to the pilot's request for three data items to be displayed is "yes" then the module 117 for displaying three "normal" data items is called up (if the reset 115 output is "no" then the display module 104 is called up).

If the output from the module 116 is "no" then the module 118 for calculating the limits on the parameters, followed by the module 119 for converting these into percentages and calculating the first limitation (IPL index), followed by the module 120 for determining the limiting parameter, and finally the module 121 for displaying one data item (the limiting parameter) are called up.

In detail, the module 101 relating to the range of validity makes it possible to test for clear-cut breakdowns of the sensors and to verify simple consistency between the various parameters.

The variables used are as follows:

inputs:
Ng—rotational speed or speed of the gas generator in percent (i.e. Ng expressed in revolutions per minute/Ng 100%)

T4—temperature at which the gases are ejected at the inlet of the free turbine in K (i.e. temperature of the gases in °C.+273)

Cm—engine torque in % (i.e. torque expressed in mda N/torque 100%)

P0 altitude (pressure in millibar)

T0 external air temperature in K (i.e. external air temperature in °C.+273).

outputs:
validity of P0, i.e. boolean variable of the validity of P0 ("valid", "invalid")

validity of T0, i.e. boolean variable of the validity of T0 ("valid", "invalid")

validity of Ng, i.e. boolean variable of the validity of Ng ("valid", "invalid")

validity of T4, i.e. boolean variable of the validity of T4 ("valid", "invalid")

validity of Cm, i.e. boolean variable of the validity of Cm ("valid", "invalid")

validity of the range, i.e. boolean variable of the validity of the range ("valid", "invalid").

The corresponding algorithm can therefore be expressed as follows:

test on P0, i.e. the expression of P0 lying within the flight range, for example $-500 \text{ m} \leq \text{altitude} \leq 6000 \text{ m}+500$ m (margin)

if $P0.k0 \leq P0 \leq P0.k1$ where P0 .k0 and P0.k1 represent altitude constants which are specific for a given example of aircraft, then the validity of P0="valid"

otherwise the validity of P0="invalid"

test on T0, i.e. the expression of T0 lying within the flight range, for example $-50° \text{ C.} \leq T0 \leq ISA+40$, limited to+50+15° C.(margin)

where ISA represents International Standard Atmosphere.

If $T0.k0 \leq T0 \leq T0.k1$ and $T0 \leq T0.k2 + T0.k3 \times P0^{(1/5.255)}$ where T0.k0, T0.k1 and T0.k2 represent temperature constants which are specific for a given example of aircraft, and $p0^{(1/5.255)}$ represents a specific pressure (altitude) associated with the standard atmosphere laws then the validity of T0="valid" otherwise the validity of T0="invalid"

test on Ng
if Ng<Ng.k0
or Ng>Ng.k1
or {Ng<Ng.k2 and [Cm>Cm.k0 and T4>T4.k0] for t1 s}
or {Ng>Ng.k3 and [Cm<Cm.k1 and T4<T4.k1] for t2 s} where all the notation with the index $k_i$ represents constants which are specific for a given example of aircraft, as will also be the case throughout the remainder of this explanation (and likewise with ti), then the validity of Ng="invalid"

otherwise the validity of Ng="valid"

test on T4
if T4<T4.k2
or T4>T4.k3
or {T4<T4.k4 and [Cm>Cm.k2 and Ng>Ng.k4] for t3s}
or {T4>T4.k5 and [Cm<Cm.k3 and Ng<Ng.k5] for t4s} then the validity of T4="ninvalid"

otherwise the validity of T4="valid"

test on Cm
if Cm<Cm.k4
or Cm>Cm.k5
or {Cm<Cm.k6 and [T4>T4.k6 and Ng>Ng.k6] for t5s}
or {Cm>Cm.k7 and [T4<T4.k7 and Ng<Ng.k7] for t6s} then the validity of Cm="invalid"

otherwise the validity of Cm="valid"

test on the validity of the range
if the validity of P0="valid"
and the validity of T0="valid"
and the validity of Ng="valid"
and the validity of T4=0)"valid"
and the validity of Cm="valid"
then the validity of the range ="valid"

otherwise the validity of the range ="invalid".

The module 106 for detecting the phase of operation has the task of determining the configuration of the aircraft in order to select the appropriate mode in which to display the data items (mode in which one data item is displayed or mode in which three data items are displayed).

Two algorithms may be envisaged:
- display in the mode in which one data item is displayed in cases where: the engine is running and the engine is shutting down, and display in the mode where three data items are displayed in cases where: the engine is shut down and the engine is starting up,
- display in the mode where one data item is displayed in the case where: the engine is running, and display in the mode where three data items are displayed in the other cases: engine shut down, engine starting up, and engine shutting down.

The variables used are as follows:

input:
    Ng outputs:
    phases of flight "start-up/shut-down" or "flight"
    engine status "engine shut down" or "engine running"

The first algorithm is therefore expressed as follows:
if Ng<Ng.k15
    then the phase of flight"flight" and engine status="engine shut down"
    otherwise engine status="engine running"
        if Ng<Ng.k8 for t7 s
        or [Ng<Ng.k9 and the previous phase="startup/shut-down"]
        then the phase of flight="start-up/shut-down" otherwise
            if Ng≧Ng.k9 for t8 s
            or [Ng≦Ng.k9 and previous phase="flight"]
            then phase of flight ="flight"
            otherwise phase of flight=previous phase.

The second algorithm is identical to the first with the following condition: Ng.k8=Ng.k9.

FIG. 5 illustrates the conditions for the first algorithm (Ng as a function of time t):
a) the phase of flight is "start-up/shut-down", i.e. Ng<Ng.k8,
b) the phase of flight is "start-up/shut-down", i.e. Ng <Ng.k9 and the previous phase is "start-up/shut-down",
c) the phase of flight is "flight", i.e. Ng<Ng.k9,
d) the phase of flight is "flight", i.e. Ng<Ng.k9 and the previous phase is "flight", and
e) identical to a).

In the module 114 which relates to calculating losses of motive power and to the P2 tapping, the various sources of loss of power are taken into account, these including especially a tapping of hot air for air-conditioning the cabin. The calculations carried out in this module depend greatly upon the specific conditions encountered, which means that we shall not be covering them in detail here.

The module 118 for calculating the limitations for display in the mode in which one data item is displayed allows:
- the limitations in T4 and Cm (constant) to be defined,
- the limitations of Ng (which is a function of P0, T0; the status of the heating and/or sandfilter options) to be calculated.

The limitations on Cm and T4 do not depend on the conditions P0, T0, whereas the common limitations on Ng are a function of the conditions P0, T0 and of any P2 tapping, i.e. a two-stage calculation. The calculation of the curbing of Ng as a function of the P2 tapping may be defined using a complex method which is not described here.

The variables used are:

inputs:
    P0 altitude (pressure in millibar)
    T0 external air temperature in K
    P2 tapping: equivalent value of the diameter of the P2 tapping orifice outputs:
    T4 (pmc)=current limitation of T4 at PMC
    T4 (pmd)=current limitation of T4 at PMD
    T4 (pmt) =current limitation of T4 at PMT
    Cm(pmc)=current limitation of Cm at PMC
    Cm(pmd)=current limitation of Cm at PMD
    Cm(pmt)=current limitation of Cm at PMT
    Ng(pmc)=current limitation of Ng at PMC
    Ng(pmd)=current limitation of Ng at PMD
    Ng(pmt)=current limitation of Ng at PMT The calculation of the limitations of each parameter T4, Cm, Ng constitutes a separate module. These modules are described in the paragraphs which follow.

There is thus:
- a module for the normal limitations on T4 (and possibly a module for T4 on start-up)
- a module for the normal limitations on Cm
- a module for the normal limitations on Ng
- a module for the current limitations on Ng.

Or, more precisely:
in the module for normal limitations on T4:
    T4(pmc)=T4 (pmc) normal
    T4(pmd)=T4 (pmd) normal
    T4(pmt)=T4 (pmt) normal
in the module for normal limitations on Cm:
    Cm(pmc)=Cm(pmc) normal
    Cm(pmd)=Cm(pmd) normal
    Cm(pmt)=Cm(pmt) normal
in the module for normal limitations on Ng:
    calculation of Ng (pmt).k(P0,T0)=Ng.k10
    calculation of Ng* (T0) as a %, where Ng* (T0) represents the limitations on the parameter Ng as a function of T0.
    calculation of the expression of Ng as a flow rate limit
    calculation of Ng(pmd).k(P0,T0)
    calculation of Ng(pmc).k(P0,T0)
in the module for the current limitations on Ng:
    calculation of derating (pmt).k(P0,T0,P2)
    calculation of derating (pmd).k(P0,T0,P2)
    calculation of derating (pmc).k(P0,T0,P2),
    in the knowledge that the term "derating" expresses the reduction in theoretical power in the instantaneous running (flight) conditions,
calculation of current limitations on Ng
    Ng(pmt)=Ng(pmt). k(P0.T0)−derating (pmt).k(P0,T0,P2)
    Ng(pmd)=Ng(pmd).k(P0.T0)−derating (pmd).k(P0,T0,P2)
    Ng(pmc)=Ng(pmc).k(P0.T0)−derating (pmc).k(P0,T0,P2)
calculation of ΔNg
    if Ng>Ng(pmd).k(P0,T0)
    then ΔNg=(Ng−Ng(pmd).k(P0,T0))/(Ng(pmt).k(P0,T0)−Ng(pmd).k(P0,T0)ΔNg.k3
    otherwise ΔNg=Ng−Ng(pmd).k(P0,T0).

The module 119 for converting the parameters into percentages of the IPL index is intended to convert the units of the parameters T4, Ng and Cm into percentages of the IPL index and to calculate the first limitation.

The variables used are, among others, as follows:

inputs:
  (pmc)=limit on Ng at PMC
  Ng(pmd)=limit on Ng at PMD
  Ng(pmt)=limit on Ng at PMT
  T4(pmc)=limit on T4 at PMC
  T4(pmd)=limit on T4 at PMD
  T4(pmt)=limit on T4 at PMT
  Cm(pmc)=limit on Cm at PMC
  Cm(pmd)=limit on Cm at PMD
  Cm(pmt)=limit on Cm at PMT outputs:
  T4%=temperature of the gases as a % of IPL
  Cm%=engine torque as a % of IPL
  Ng%=speed of the gas generator as a % of IPL
  IPL%=first limitation The corresponding algorithm is therefore expressed as follows:

initial settings:
  Ng%=0
  CM%=0
  T4%=0
conversion of T4 into T4%
  calculation of T4 for zero power ($T4_0^*$)
    $\gamma 1 = (p0/P00)^{n1}$
    $\Phi 1 = (T0/T015)^{p1}$
    $T4_0^* = T4.k8 \times (\gamma 1 = \Phi 1)$
  if T4>T4(pmd)
    then T4%=100%+CTPCMPT.T4×(T4−T4(pmd))/(T4(pmt)−T4(pmd))
  otherwise
    if T4>T4(pmc)
      then T4%=90%+10%×(T4−T4(pmc))/(T4(pmd)−T4(pmc))
    otherwise T4%=90%×(T4−$T4_0^*$)/(T4(pmc)−$T4_0^*$)
conversion of Ng into Ng%
  calculation of Ng for zero power
    $\gamma 3 = (T0/T015)^{n3}$
    $Ng_0^* = Ng.k14 \times \gamma 3$
  if ng>Ng(pmd)
    then Ng%=100%+CTPCMT.Ng×(Ng−Ng(pmd))/(Ng(pmt)−Ng(pmd))
  otherwise
    if Ng>Ng(pmc)
      then Ng%=90%+10%×(Ng—Ng(pmc))/(Ng(pmd)−Ng(pmc))
    otherwise Ng%=90%×(Ng−$Ng_0^*$)/(Ng(pmc)−$Ng_0^*$)
    conversion of Cm into Cm%
  if Cm>Cm(pmd)
    then Cm%=100%+CTPCMT.Cm×(Cm−Cm(pmd))/(Cm(pmt)−Cm(pmd))
  otherwise
    if Cm>Cm(pmc)
      then Cm%=90%+10%×(Cm−Cm(pmc))/(Cm(pmd)−Cm(pmc))
    otherwise Cm%=90%×Cm/Cm(pmc)
    (CTPCMT representing a percentage difference in IPL indicator between the end values PMD and PMT)
determination of the value of the IPL index IPL%= maximum (Ng%, T4%, Cm%)

The module 120 for determining the limiting parameter determines the limiting parameter (Ng, T4 or Cm). It will be noted that in order to avoid this display flashing, a change of status to switch from one limiting parameter to another is not validated until n identical consecutive data items have been received.

The variables used are as follows:

inputs:
  Ng%=speed of the gas generator as % of the IPL index
  T4%=temperature of gases at % of the IPL index
  Cm%=engine torque as a % of the IPL index outputs:
  limiting parameter: a variable with three states ("Ng", "T4", "Cm").

The corresponding algorithm is therefore expressed as follows:

initial setting: limiting parameter="Ng"(changeable)
determination of the limiting parameter:
  if the limiting parameter="T4"
    if Cm%>T4%+EPPC.T4 and Cm%≧Ng%
      then limiting parameter="Cm"
    if Ng%>T4%+EPPC.T4 and Ng%>Cm%
      then limiting parameter="Ng"
  otherwise, if limiting parameter="Ng"
    if Cm%>Ng%+EPPC.Ng and Cm%≧T4%
      then limiting parameter="Cm"
    if T4%>Ng%+EPPC.Ng and T4%>Cm%
      then limiting parameter="T4"
  otherwise, if limiting parameter="cm"
    if T4%>Cm%+EPPC.Cm and T4%≧Ng%
      then limiting parameter="T4"
    if Ng%>Cm%+EPPC.Cm and Ng%>T4%
      then limiting parameter="Ng",
  with EPPC.(T4, Ng, Cm) expressed as a percentage (for example equal to 1) relating to the threshold at which the limiting parameter is changed.

The indicator according to the invention thus makes it possible to display on one screen all the data items supplied by various sensors. This indicator therefore shows the following information at every moment on one (or several) graduated dial(s):

the current situation of the engine, the position of the pointer representing the power supplied by the engine at every moment;

the limitations of the machine: colored regions, lines, triangles and the like representing the various limiting levels.

In particular, the distance separating the pointer (display with just one dial) and a limitation gives a "representation" of the power margin available to the pilot in the current flight situation.

It will also be noted that the information supplied by the indicator of the invention, in addition to giving a direct display on a display screen, may also be used as basic information for formulating an effort law, allowing the pilot to be warned that he is approaching a limitation using physical means: hardening of a spring or jack, vibration, for example.

What is claimed:

1. A flight indicator for a helicopter having at least one turbine engine with a gas generator and a free turbine, said flight indicator being intended to give the power margin available on said engine and comprising:

(a) sensors capable of delivering current values relating respectively to the following three parameters:
  (i) the speed of said gas generator,
  (ii) the temperature at which the gases are ejected at the inlet to said free turbine, and
  (iii) the engine torque, (b) computing means for comparing said current values to respective limiting values, each of said limiting values being determined as a function of the pressure and the temperature outside said helicopter, and (c) display means showing on a display screen, the current value relating to that parameter, among said three parameters, whose current value is closest to the respective limiting value.

2. The flight indicator as claim 1, wherein, in said computing means, the current values of the gas generator speed and of the gas temperature are converted to a scale which is comparable with the engine torque, after they have been compared with their respective limiting value.

3. The fight indicator as claimed in claim 2, wherein each said limiting values is a function of any power drawn off from the aircraft engine.

4. The indicator as claimed in claim 2, wherein said current values of the gas generator speed, of the gas temperature and of the engine torque are expressed as percentages of their respective limiting values.

5. The indicator as claimed in claim 1, wherein displayed on said display screen is just one dial showing the parameter whose current value is closest to the respective limiting value.

6. The indicator as claimed in claim 1, wherein displayed on said display screen are as many dials as there are monitored engine parameters, the parameter whose current is closest to the limiting value being emphasized.

* * * * *